United States Patent
Benkreira et al.

(10) Patent No.: US 11,961,085 B2
(45) Date of Patent: Apr. 16, 2024

(54) SYSTEMS AND METHODS FOR SETTING SPEND LIMITS AND COUNTERACTING FRAUD IN GAS STATION TRANSACTION

(71) Applicant: Capital One Services, LLC, McLean, VA (US)

(72) Inventors: Abdelkader Benkreira, New York, NY (US); Nimma Bhusri, New York, NY (US); Kaylyn Gibilterra, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 65 days.

(21) Appl. No.: 17/730,245

(22) Filed: Apr. 27, 2022

(65) Prior Publication Data
US 2022/0253861 A1 Aug. 11, 2022

Related U.S. Application Data

(63) Continuation of application No. 16/879,112, filed on May 20, 2020, now Pat. No. 11,348,113.

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01); *G06Q 20/40155* (2020.05); *G06Q 20/405* (2013.01)

(58) Field of Classification Search
CPC .......... G06Q 20/4016; G06Q 20/3224; G06Q 20/40155; G06Q 20/405; G06Q 20/308; G06Q 20/4015; G06Q 20/18; G07F 15/10

(Continued)

(56) References Cited

U.S. PATENT DOCUMENTS 7,866,544 B1 1/2011 Block et al.
9,317,845 B1 * 4/2016 Ekselius .............. G06Q 20/341
(Continued)

OTHER PUBLICATIONS

Pritchard, Catherine, "The Fayetteville Observer, N.C., Credit card deal can offset gas prices", Tribune Business News [Washington ], May 31 (Year: 2008).*

(Continued)

*Primary Examiner* — Frantzy Poinvil
(74) *Attorney, Agent, or Firm* — TROUTMAN PEPPER HAMILTON SANDERS LLP; Christopher J. Forstner; John A. Morrissett (57) ABSTRACT

The disclosed technology relates to Spend Limit Systems for gas-station refuel transactions. An exemplary system may receive vehicle information identifying a customer's vehicle and identify associated vehicle characteristics (e.g., gas tank size). The system may identify a known gas-station transaction geographic region for the customer. When the customer (or a fraudster) attempts to purchase gas, the system may receive a transaction request and, in response, set a single transaction limit sufficient to fill the gas tank size with gas and an associated spend limit. The system may also determine whether the merchant location falls within the known gas-station transaction geographic region. When it does, the system may approve the transaction request up to the spend limit. Otherwise, the system may perform one or more fraud prevention actions to authenticate the customer and either approve or deny the transaction request up to the spend limit and/or selectively perform fraud mitigation action(s).

20 Claims, 5 Drawing Sheets

(58) Field of Classification Search
USPC ........................................................ 705/3–44
See application file for complete search history.

(56) References Cited

U.S. PATENT DOCUMENTS

| | | | |
|---|---|---|---|
| 10,027,501 B1* | 7/2018 | Watson | H04L 12/2809 |
| 10,163,141 B2 | 12/2018 | Fansler et al. | |
| 10,504,094 B1 | 12/2019 | Gaudin et al. | |
| 10,825,073 B1* | 11/2020 | Walters | G06N 5/046 |
| 2006/0218056 A1* | 9/2006 | Dickman | G06Q 30/06 |
| | | | 705/28 |
| 2008/0005055 A1* | 1/2008 | Horvitz | G06Q 10/04 |
| | | | 706/62 |
| 2008/0195432 A1* | 8/2008 | Fell | G06Q 30/0206 |
| | | | 705/16 |
| 2009/0048945 A1 | 2/2009 | DeLine | |
| 2013/0013431 A1 | 1/2013 | Fansler et al. | |
| 2014/0067540 A1* | 3/2014 | Williams | G06Q 30/0261 |
| | | | 705/14.58 |
| 2014/0201077 A1* | 7/2014 | Cama | G06Q 20/405 |
| | | | 705/44 |
| 2014/0289115 A1 | 9/2014 | Basile et al. | |
| 2015/0228017 A1* | 8/2015 | Momin | G06Q 40/03 |
| | | | 705/38 |
| 2016/0189158 A1 | 6/2016 | Eramian | |
| 2017/0076265 A1* | 3/2017 | Royyuru | G06Q 20/18 |
| 2017/0076274 A1* | 3/2017 | Royyuru | G06Q 20/18 |
| 2018/0053178 A1 | 2/2018 | Shah | |
| 2019/0295189 A1* | 9/2019 | Strasser | G06Q 20/18 |

OTHER PUBLICATIONS

"AAA Offers Ways to Save Money on Gas during Holiday Driving", Proquest Doc. Id: 817453222, PR Newswire, Dec. 14, Year: 2010).
Pay-at-Pumb petrol terminals to spell end of forecourt queues, Proquest Dic, Id: 87003729, M2 Presswire Jun. 7, (Year: 2002).

* cited by examiner

SYSTEMS AND METHODS FOR SETTING SPEND LIMITS AND COUNTERACTING FRAUD IN GAS STATION TRANSACTION

CROSS REFERENCE TO RELATED APPLICATIONS

This application is a continuation of U.S. patent application Ser. No. 16/879,112, filed 20 May 2020, now U.S. Pat. No. 11,348,113 and published as U.S. Patent Application Publication No. US 2021/0365947 on 25 Nov. 2021, the contents of which is incorporated herein by reference as if presented in full.

FIELD

The disclosed technology relates to systems and methods for setting spend limits and detecting and counteracting fraud in gas station transactions, and more particularly fraud detection, prevention, and mitigation systems that employ customer-specific spend limits for gas station transactions based on the customer's vehicle and/or transaction history.

BACKGROUND

Credit card lenders are faced with the problem of fraudulent credit card purchases and associated revenue loss when goods are obtained using lost or stolen credit cards. Fraudsters who steal someone's credit card will often attempt to buy consumable products and goods that have immediate value and a low risk of the fraudster getting caught. Gasoline purchases fit this category because such credit card transactions can be performed at an unmanned payment terminal. Balancing the threats of credit card fraud with efficient service for legitimate cardholder creates significant challenges for credit lenders.

Accordingly, there is a need for improved fraud-detection systems for gas station transactions. This disclosed systems and methods are directed to this and other considerations.

BRIEF SUMMARY

Aspects of the disclosed technology include systems and methods for limiting fraudulent credit card transactions based on account-level transaction factors and approval rules. Credit card transactions for gasoline at unmanned payment terminals may be approved, declined, or limited based on factors such as a legitimate user's spend patterns, vehicle type, gas tank capacity, etc.

The disclosed technology includes a spend limit system for gas-station refuel transactions. The system includes one or more processors and memory in communication with the one or more processors and storing instructions that, when executed by the one or more processors, are configured to cause the system to perform one or more methods. For example, the system may receive customer vehicle information identifying a first vehicle associated with a customer having a customer financial account and identify first vehicle characteristics associated with the first vehicle (e.g., a first gas tank size). The system may then identify a known gas-station transaction geographic region for the customer based on prior gas-station transactions associated with the customer. When the customer (or a fraudster) attempts to purchase gas, the system may receive a transaction request to complete a gas-station transaction using the customer financial account. The transaction request may include a merchant location. In response, the system may identify a local gas price based on the merchant location, set a single transaction limit sufficient to fill the first gas tank size with gas at the identified local gas price based on the first vehicle characteristics, and set a spend limit based on the single transaction limit. The system may also determine whether the merchant location falls within the known gas-station transaction geographic region. When it does, the system may approve the transaction request up to the spend limit. When it does not, the system may perform one or more fraud prevention actions to authenticate the customer. Responsive to authenticating the customer within a predetermined time threshold, the system may approve the transaction request up to the spend limit and monitor a predetermined number of subsequent transactions associated with the customer financial account for fraud. Responsive to not authenticating the customer within the predetermined time threshold, the system may deny the transaction request and perform one or more fraud mitigation actions.

The disclosed technology includes another spend limit system for gas-station fuel purchase transactions. The system includes one or more processors and memory in communication with the one or more processors and storing instructions that, when executed by the one or more processors, are configured to cause the system to perform one or more methods. For example, the system may receive customer vehicle information identifying several vehicles (e.g., a first vehicle that is a smaller, fuel-efficient daily driver and a second, larger vehicle that is primarily used for family trips) associated with a first customer having a customer financial account. For each vehicle, the system may identify vehicle characteristics (e.g., gas tank size). When the customer (or a fraudster) attempts to purchase gas, the system may receive a transaction request to complete a gas-station transaction using the customer financial account. The transaction request may include a merchant location and a transaction date. In response, the system may identify a local gas price based on the merchant location and determine whether the transaction request is associated with the first vehicle or the second vehicle. Responsive to determining that the transaction request is associated with the first vehicle (e.g., the daily driver with a smaller gas-tank size), the system may set a first single transaction amount limit sufficient to fill the first gas tank size with gas at the identified local gas price and approve the transaction request up to the first single transaction amount limit. Responsive to determining that the transaction request is associated with the second vehicle (e.g., the larger vehicle used for family trips), the system may set a second single transaction amount limit sufficient to fill the second gas tank size with gas at the identified local gas price and approves the transaction request up to the second single transaction amount limit. In this manner, the system may limit risk due to fraud by only authorizing the gas-station transaction limit to re-fill the appropriate vehicle. The system may also consider vehicle fuel efficiency and the timing of a prior gas transaction for a particular vehicle in setting a minimum time between gas-station transactions and/or a daily gas-station transaction limit.

The disclosed technology includes yet another spend limit system for gas-station fuel purchase transactions. The system includes one or more processors and memory in communication with the one or more processors and storing instructions that, when executed by the one or more processors, are configured to cause the system to perform one or more methods. For example, the system may receive customer vehicle information identifying a first vehicle of a first customer having a customer financial account, and identify first vehicle characteristics (e.g., gas tank size) associated with the first vehicle. The system may receive a transaction request to complete a gas-station transaction using the customer financial account, and the transaction request may include a merchant location and a transaction date. In response, the system may identify a local gas price based on the merchant location and generate, based at least in part on the first vehicle characteristics and the identified local gas price, a single transaction amount limit sufficient to fill the gas tank size with gas at the identified local gas price. The system may also determine whether one or more gas-station transaction fraud prevention measures are met. When the one or more gas-station transaction fraud prevention measures are met, the system may approve the transaction request up to the single transaction amount limit. When one or more gas-station transaction fraud prevention measures are not met, the system may perform one or more fraud mitigation actions.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

DETAILED DESCRIPTION

Certain implementations of the disclosed technology may be utilized to limit or eliminate fraudulent credit card purchases of gasoline. Automated fuel dispensers with unmanned credit card readers can provide quick and efficient gas purchases for customers, but once fraudulently purchased gas has been dispensed, recovery options are severely limited. In contrast, when a purchase for shipped goods is determined to be fraudulent, the shipment can be stopped or intercepted. Embodiments of the disclosed technology may be utilized to limit fraud exposure associated with gasoline purchases.

In certain implementations, one or more vehicles (and certain vehicle characteristics) may be associated with a legitimate cardholder's account. Such vehicle characteristics can include gas tank capacity and the vehicle's expected miles-per-gallon. Such characteristics, combined with known regional gasoline prices, cardholder spend patterns, etc., may be utilized to determine a pre-approved gas purchase limit. For example, a gas purchase may be approved, but limited to the cost required to fill the gas tank of a cardholder's certain vehicle. Implementations of the disclosed technology may prevent or limit damages/costs due to fraud, particularly in cases where a fraudster may be attempting to make a fraudulent purchase for an amount greater than it would cost to fill a gas tank of a vehicle associated with the cardholder's account and/or outside of the cardholder's known area for purchasing gas. Additionally, such implementations may also take fraud mitigation action(s) for the cardholder's account to further limit potential exposure due for additional attempts for make fraudulent purchases.

As will be discussed below, certain implementations may provide additional technical flexibility to account for cardholders who have multiple vehicles (with varying different vehicle characteristics) associated with the same account. Certain exemplary implementations may utilize one or more of: regional pricing information, location data, transaction patterns, machine learning models, user-defined limits, and/or transaction frequency to limit the exposure to fraud loss, while providing efficient service for legitimate cardholder.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
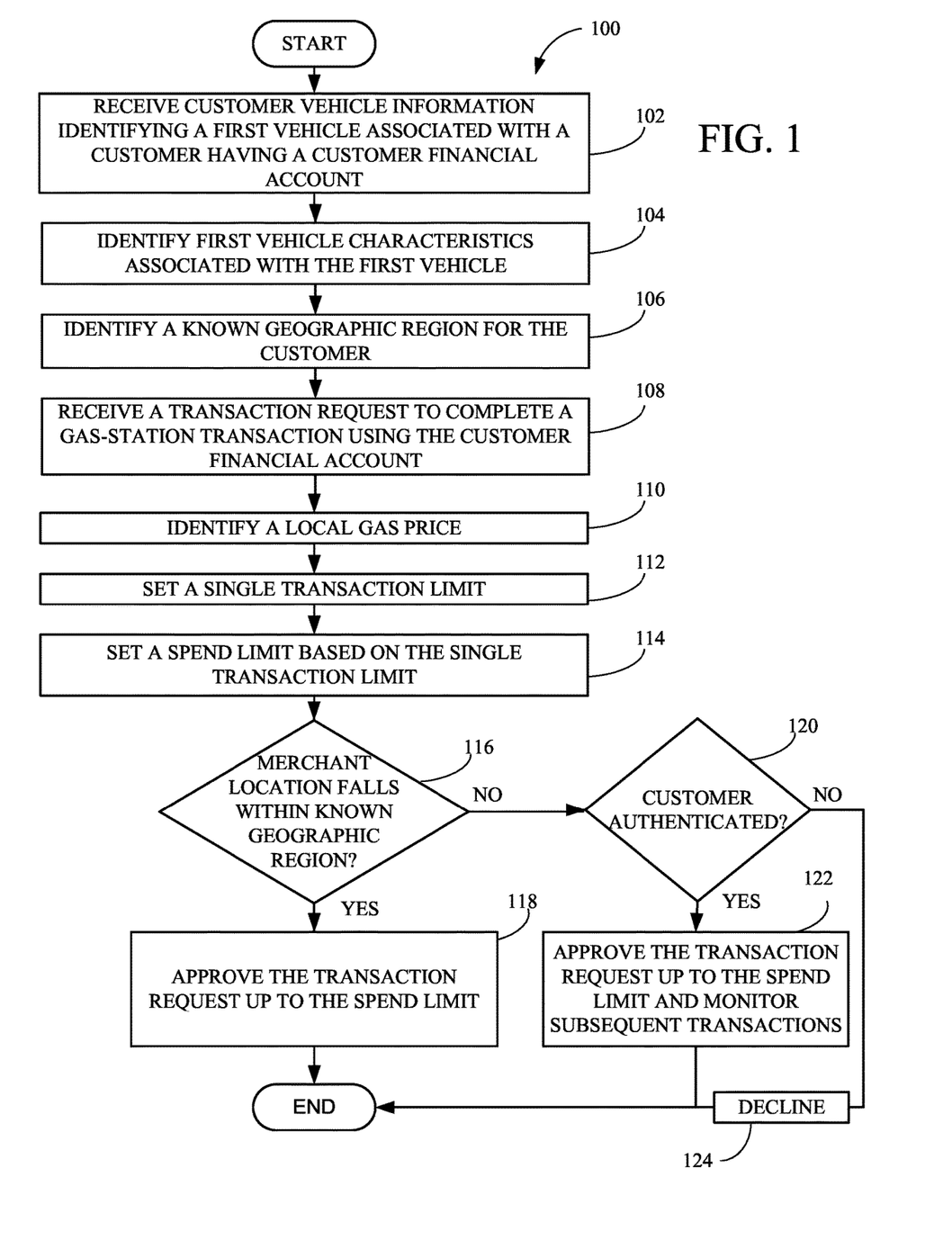
FIG. 1 is a flow diagram of an example method 100 for setting a gas-station transaction spend limit for a customer's vehicle, selectively approving/denying a transaction request up to that spend limit based on geographic location, and selectively performing fraud prevention and/or fraud mitigation action(s), in accordance with an exemplary embodiment of the disclosed technology.

FIG. 1 is a flow diagram of a method 100 for setting a gas-station transaction spend limit for a customer's vehicle, selectively approving/denying a transaction request up to that spend limit based on geographic location, and selectively performing fraud prevention and/or fraud mitigation action(s). Method 100 may be performed by a spend limit system (e.g., a Spent Limit System 400 and/or one or more subsystems thereof, such as a fraud prevention system 410, as described in more detail with respect to FIGS. 4-5). The system includes one or more processors and memory in communication with the one or more processors and storing instructions. When executed by the one or more processors, the stored instructions cause the system to perform certain functions.

In block 102, the system may receive customer vehicle information identifying a first vehicle associated with a customer having a customer financial account. For example, this could involve a customer/cardholder providing information (e.g., make, model, trim, year, fuel economy, engine size, optional features, etc.) on his or her vehicle(s) directly to the system (e.g., via a mobile application, internet browser, etc.) or indirectly via the customer's financial service provider. The customer may have multiple associated vehicles and/or designate other persons who are associated with the customer's vehicles. For example, a customer may provide vehicle information for his small sedan, which serves as his daily driver, has a 12-gallon gas tank, and gets 30 miles per gallon (mpg). The customer may provide similar information for his truck (he drives it sporadically, has a 20-gallon gas tank, and gets 12 mpg) and his wife's SUV (he drives it only on family trips, has a 22-gallon gas tank, and gets 16 mpg). The customer may designate, for example, himself and his wife and teenage daughter as authorized drivers of all three vehicles.

In block 104, the system may identify first vehicle characteristics (e.g., a first gas tank size, fuel economy, etc.) associated with at least the first vehicle. The vehicle characteristics may be provided to the system as part of the customer vehicle information and/or separately determined by the system (e.g., by using make, model, trim, and year to retrieve the tank size and fuel economy from an internal or external database or via a third party service provider).

In block 106, the system may identify a known gas-station transaction geographic region for the customer, which may be based on prior gas-station transactions associated with the customer and/or similar customers. Similar customers, for example, may be identified algorithmically by factors such as similar location/geography, income, spend behaviors, occupation, demographic data etc. To identify the known gas-station transaction geographic region for a customer, the system may train a machine learning model with historical gas-station transaction data for that customer and/or similar customers and use the trained model to define a region that is commonly traveled by the customer as evidenced by where he has historically purchased gas. The historical gas-station transaction data may be based on the customer's prior card-present transaction data. Such transaction data can be utilized to determine where the customer usually goes to purchase gas (or shop) in relation to their home address. In certain implementations, merchant category codes and merchant ID's in transaction data may be utilized to identify transactions and/or distinguish between gas and retail spend transactions. In situations where the customer has limited historical data for which to determine their gas-station transaction geographic region, (e.g., new customer, recently moved, etc.), the machine learning model may be trained using the available history for the customer and history from similar customers. In some examples, the system will define the gas-station transaction geographic region as being within 100 miles of the location of a past gas-station transaction within the last three years, though the system couple employ other predefined distance (i.e., 100 miles) and time (i.e., three years) constraints and/or set the distance and time constraints based on customer input.

In block 108, when the customer or a fraudster attempts to purchase gas, the system may receive (e.g., from a merchant terminal of a gas-station) a transaction request to complete a gas-station transaction using the customer financial account. In certain implementations, the transaction request can include a merchant location, a merchant identifier, and a financial account identifier indicative of or associated with the customer financial account.

In response receiving the transaction request, in block 110, the system may identify a local gas price, and this identification may be based on the merchant location. For example, the system may identify current gas prices from nearby merchants (e.g., getting that information from the merchants directly or from transactions by other customers) and average those prices to identify the local gas price. In other examples, the system may use a third-party service to identify a best or average gas price of nearby merchants, and designate one of those prices as the local gas price. In some examples, the system may identify a local gas price for the applicable gas type (e.g., unleaded, premium, diesel, etc.) based on the identified first vehicle characteristics and/or user input if the vehicle accepts multiple types of gas. In this manner, the system may identify a lower and more accurate local gas price for a vehicle that takes unleaded gas.

In block 112, the system may set a single transaction limit sufficient to fill the first gas tank size with gas at the identified local gas price based on the first vehicle characteristics. To do this, the system takes into account gas tank size for the first vehicle, assumes that the tank is empty, and multiplies the number of gallons that the gas tank will hold by the identified local gas price (which may be based on a vehicle-specific gas type). The system may further utilize transaction data to detect and prevent attempted multiple transactions that are indicative of attempts to circumvent the system. The system, for example, may set a minimum time period that must elapse between gas purchase transactions. The minimum time period may be calculated based on the amount of gas purchased in the most recent transaction, the known miles-per-gallon of the vehicle associated with the credit card, and a maximum speed limit in the region (or nationally).

In block 114, the system may set a spend limit based on the single transaction limit. Optionally, the system may build in a buffer to the single transaction limit to ensure the customer can always fill a full tank of gas. The buffer, for example, may enable the customer to still fill their tank in situations where the gas price changes suddenly, or when the customer selects a more expensive grade of gas, To do this, the system may auto-generate a buffer based on whether the transaction is deemed too risky (e.g., if the system is monitoring the customer's transactions as part of a fraud mitigation step). For example, the system may automatically include a 10% buffer such that the spend limit would allow the customer to theoretically overfill the gas tank by 10% based on the identified gas price. If the transaction is deemed too risky (e.g., the system is monitoring the customer's transactions as part of a fraud mitigation step), the system may drop the buffer to a lower number such as 2% of 0%. The system may also base the buffer level on user input.

In block 116, the system may and determine whether the merchant location falls within the known gas-station transaction geographic region. The system may do this by determining a known region in which the customer frequently purchases gas based on past transaction history for the customer and compare the merchant location to that known region. Merchant Category Codes (MCC), Merchant Name and/or Merchant ID, for example, may be utilized to identify the appropriate merchants and locations. In certain implementations, merchants identified as gas stations (by the MCC) may be emphasized or prioritized in the determination of the gas-station transaction geographic region. In certain implementations, transactions in the customer history that are indicated as "card-present" may be emphasized or prioritized in the determination of the gas-station transaction geographic region for the customer. When the merchant location falls within the known gas-station transaction geographic region, in block 118, the system may approve the transaction request up to the spend limit. Conversely, when the merchant location falls outside of the known gas-station transaction geographic region, in block 120 the system may perform one or more fraud prevention actions to authenticate the customer. Such fraud prevention actions can include certain types of multi-factor authentication communications/confirmations, for example, via the customers mobile computing device. The fraud prevention actions can include one or more of SMS message confirmation, e-mail confirmation, PIN entry, password entry, touchID, biometric confirmation, etc.

Responsive to authenticating the customer within a predetermined time threshold, in block 122, the system may approve the transaction request up to the spend limit and may monitor a predetermined number of subsequent transactions associated with the customer financial account for fraud. In certain implementations, the predetermined number of monitored subsequent transactions may be based on factors including but not limited to the amount of time between transactions, the spend amounts, the particular credit product, the customer spend history, and/or similar customer spend history. Conversely, responsive to not authenticating the customer within the predetermined time threshold, in block 124, the system may decline the transaction request and/or may perform one or more fraud mitigation actions.

Figure 2:
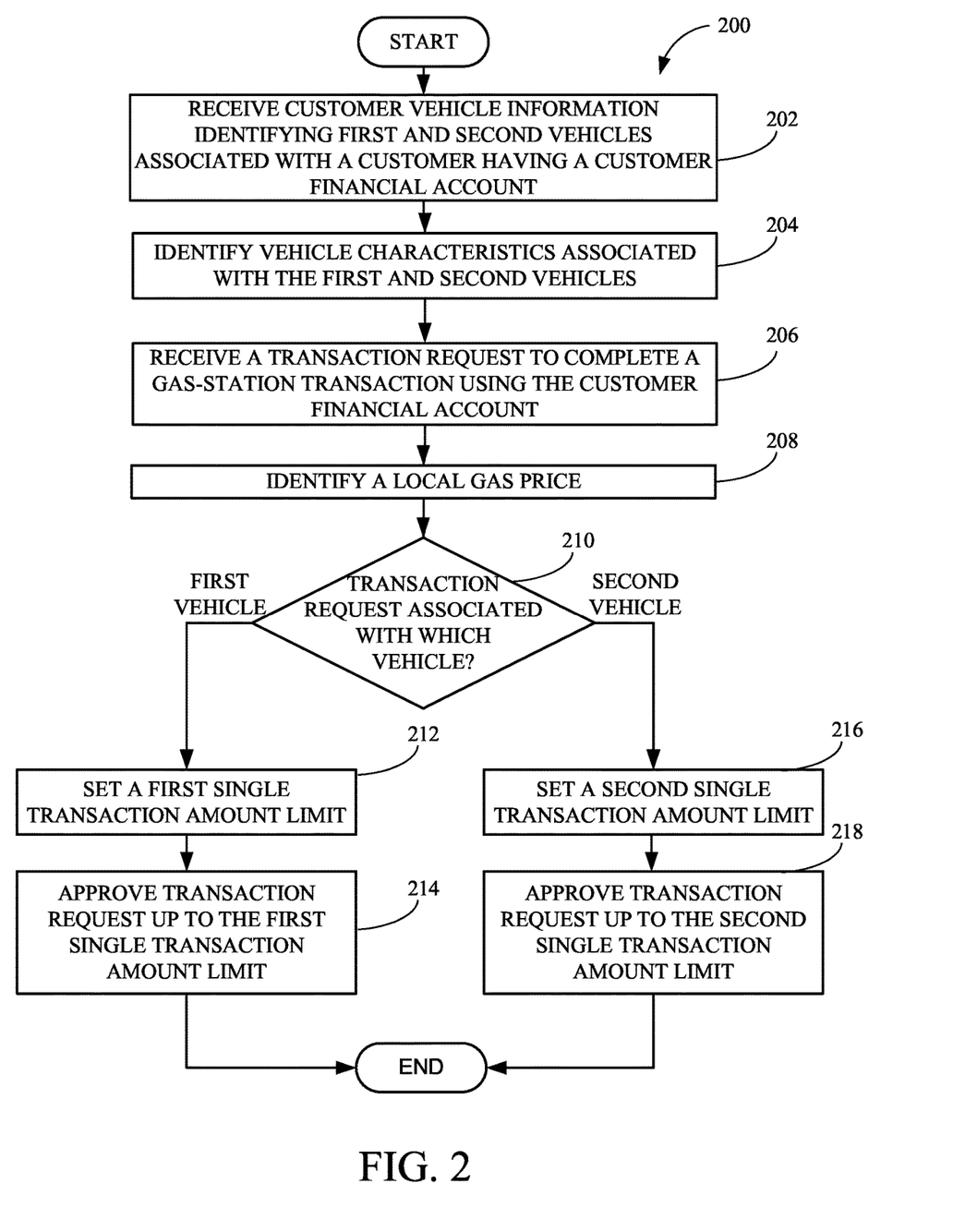
FIG. 2 is a flow diagram of an example method 200 for setting a vehicle-specific gas station transaction spend limit for a customer associated with multiple vehicles, in accordance with another exemplary embodiment of the disclosed technology.

FIG. 2 is a flow diagram of a method 200 performed by a spend limit system for gas-station transactions to approve a purchase at a gas-station up to a determined spend limit for more than one vehicle associated with a customer financial account, in accordance with an exemplary embodiment of the disclosed technology. The system includes one or more processors and memory in communication with the one or more processors and storing instructions. When executed by the one or more processors, the stored instructions cause the system to perform certain functions. In block 202, the system may receive customer vehicle information identifying a first vehicle and a second vehicle each associated with a first customer having a customer financial account. That is, in contrast to block 102 in method 100, the system may receive similar information for multiple vehicles (e.g., a primary vehicle and a secondary vehicle).

In block 204, the system may identify first vehicle characteristics associated with the first vehicle and the second vehicle similar to block 104. In certain implementations, the first vehicle characteristics can include a first gas tank size. In certain implementations, the second vehicle characteristics can include a second gas tank size. In block 206, the system may receive a transaction request to complete a gas-station transaction using the customer financial account similar to block 108. In certain implementations, the transaction request can include one or more of a merchant location and a transaction date. In block 208, the system may identify a local gas price similar to block 110.

In block 210, the system may determine whether the transaction request is associated with the first vehicle or the second vehicle. For example, the system may receive an indication of a short-range wireless communication connection between the customer's mobile device and either the first vehicle or second vehicle and determine that the vehicle for which gas is being purchased is the one currently "connected" to the customer's mobile device. In certain example implementations, the system may determine whether the transaction request is associated with the first vehicle or the second vehicle based on location information received from a GPS device installed in the vehicle. In some implementations, the system, upon receiving an authorization request, may query a customer (for example, via their mobile computing device) to select the vehicle that they wish to fill with gas, and the spend limit may be set accordingly. In other example implementations, a gas station and/or pump may be equipped with a reader that can determine the model and/or or vehicle ID information. Such information may be passed to the system (for example, along with the transaction data) to positively identify the vehicle that is being fueled.

Responsive to determining that the transaction request is associated with the first vehicle, in block 212, the system may set a first single transaction amount limit sufficient to fill the first gas tank size with gas at the identified local gas price (similar to block 112 and/or block 114), and in block 214, may approve the transaction request up to the first single transaction amount limit similar to block 122. Responsive to determining that the transaction request is associated with the second vehicle, in block 216, the system may set a second single transaction amount limit sufficient to fill the second gas tank size with gas at the identified local gas price (similar to block 112 and/or block 114), and in block 218, may approve the transaction request up to the second single transaction amount limit similar to block 122. Although steps similar to blocks 116 through 124 are not explicitly shown in FIG. 2, method 200 may include similar steps.

Figure 3:
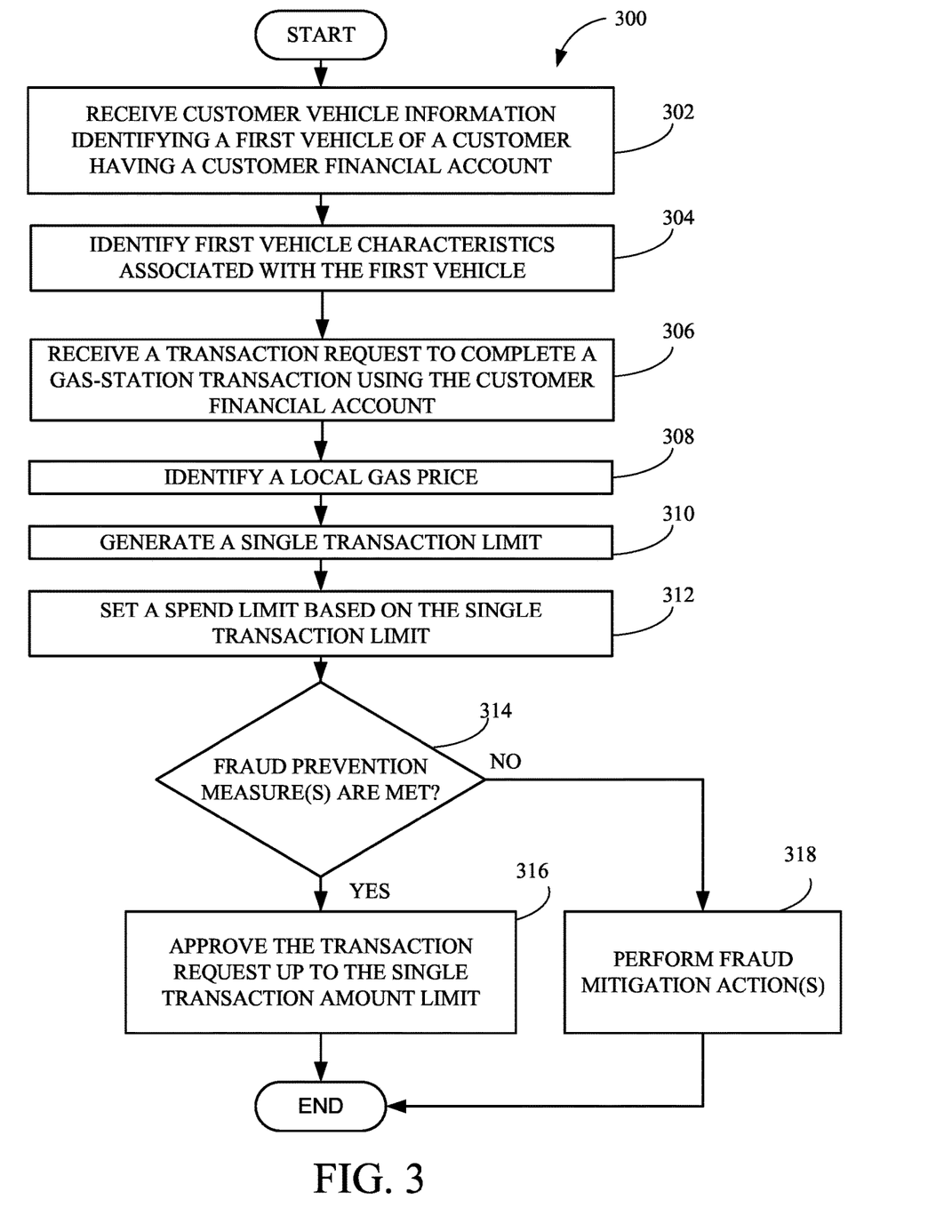
FIG. 3 is a flow diagram of an example method 300 for setting a gas-station transaction spend limit for a customer's vehicle, determining whether fraud prevention measure(s) are met, and selectively approving/denying a transaction request up to that spend limit or performing fraud mitigation action(s), in accordance with yet another exemplary embodiment of the disclosed technology.

FIG. 3 is a flow diagram of a method 300 performed by a spend limit system for gas-station transactions to prevent fraud associated with a gas-station transaction, in accordance with an exemplary embodiment of the disclosed technology. The system includes one or more processors and memory in communication with the one or more processors and storing instructions. When executed by the one or more processors, the stored instructions cause the system to perform certain functions. In block 302, the system may receive customer vehicle information identifying a first vehicle of a first customer having a customer financial account similar to block 102 of method 100. In block 304, the system may identify first vehicle characteristics associated with the first vehicle similar to block 104. In certain implementations, the first vehicle characteristics can include a gas tank size. In block 306, the system may receive a transaction request to complete a gas-station transaction using the customer financial account similar to block 108. In certain implementations, the transaction request can include a merchant location and a transaction date. In block 308, the system may identify a local gas price, which can be based on the merchant location similar to block 110. In block 310, the system may generate a single transaction limit similar to block 112. For example, the generated single transaction limit may be based at least in part on the first vehicle characteristics and the identified local gas price. In certain implementations, in block 312, the system may set a spend limit based on the single transaction amount limit similar to block 114. In certain implementations, the spend limit may be set at a value that is sufficient to fill the gas tank size with gas at the identified local gas price. In block 314, the system may determine whether one or more gas-station transaction fraud prevention measures are met. Such fraud prevention measures can include multi-factor authentication communications/confirmations, SMS message confirmation, e-mail confirmation, PIN entry, password entry, touchID, biometric confirmation, etc. When the one or more gas-station transaction fraud prevention measures are met, in block 316, the system may approve the transaction request up to the single transaction amount limit similar to block 122. When one or more gas-station transaction fraud prevention measures are not met, in block 318, the system may perform one or more fraud mitigation actions similar to block 124.

Figure 4:
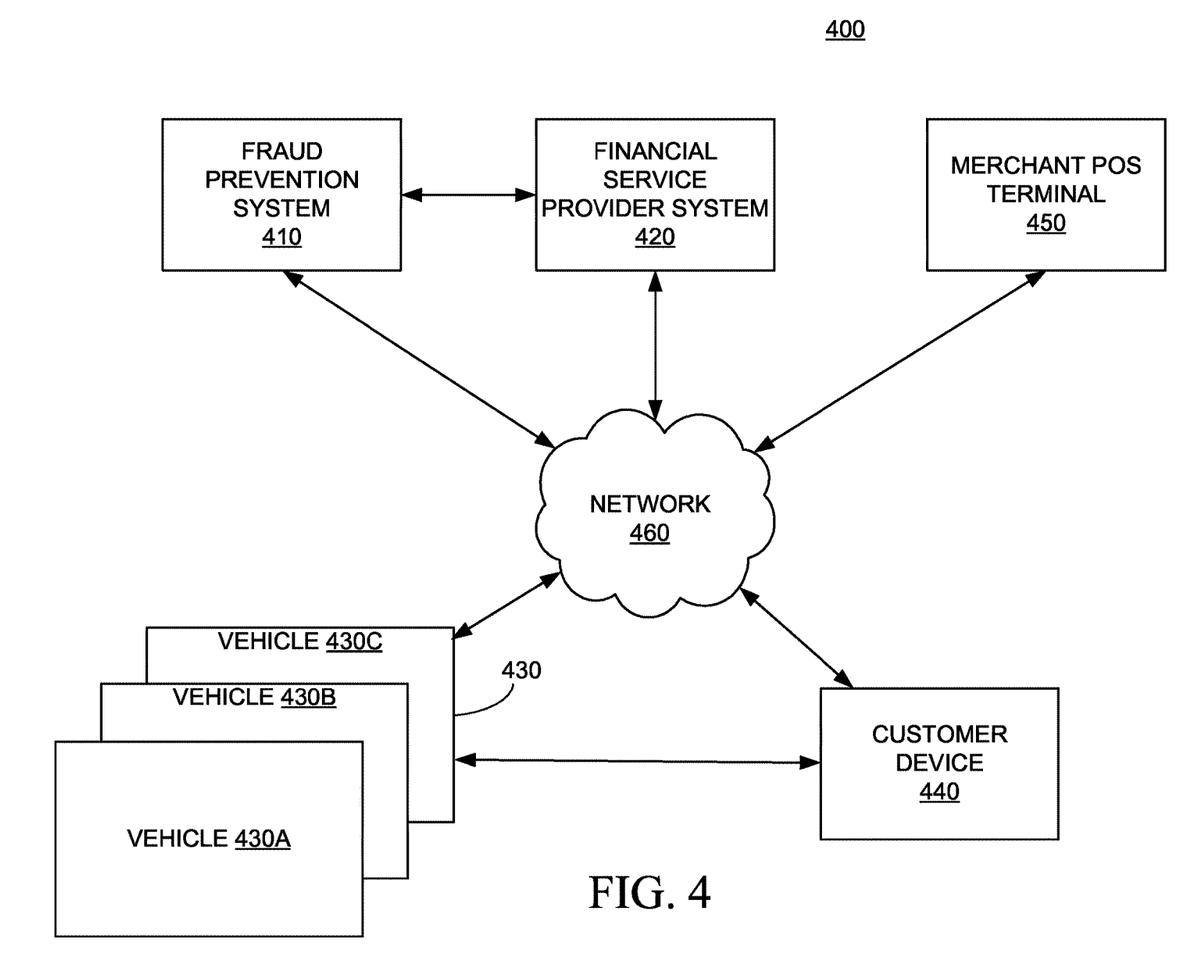
FIG. 4 is a block diagram of a Spend Limit System 400, according to certain exemplary implementations of the disclosed technology.

FIG. 4 is a block diagram of a Spend Limit System 400, according to certain exemplary implementations of the disclosed technology. The Spend Limit System 400 may include a Fraud Prevention System 410 (as will be discussed in more detail below with reference to FIG. 5) that may be in communication (either directly or via a network 460) with a Financial Service Provider System 420.

In certain implementations, the Financial Service Provider System 420 may store and/or have access to detailed customer information, such as Vehicle(s) 430 owned, temporarily driven (such as a rental car), and/or otherwise associated with the customer. In some instances, a customer may be associated with multiple vehicles 430A, 430B, 430C, etc. In some cases, customers may opt-in to a fraud prevention/spend limit program by registering the make, model, and year of their Vehicle(s) 430 with the entity associate with the Financial Service Provider System 420. In some implementations, publicly available records may be accessed/utilized by the Spend Limit System 400 to associate one or more particular vehicle(s) 430 with a customer account. The National Motor Vehicle Title Information System (NMVTIS) or similar public records, for example, may be utilized to obtain vehicle information that may be associated with customers of the Financial Service Provider System 420.

In accordance with certain exemplary embodiments, the Fraud Prevention System 410 may utilize vehicle information associated with a customer to determine a gas tank capacity of the customer's Vehicle(s) 430. The Fraud Prevention System 410 may further obtain fuel prices corresponding to the region in which the customer refuels (and/or is expected to refuel) their Vehicle(s) 430. The Fraud Prevention System 410 may calculate the gas tank capacity (in gallons) multiplied by the average regional fuel price (in dollars per gallon) to determine a fuel spend limit at the Merchant Point-Of-Sale (POS) Terminal 450 (such as an automated/unmanned gas pump). The fuel spend limit may be utilized to authorize a maximum dollar amount that a customer can charge to their credit card using the Merchant POS Terminal 450 in a time period. In certain implementations, the time period and/or the fuel spend limit may be calculated based on customer refuel history, indications of routine/non-routine driving patterns, etc.

In certain implementations, a customer may be taking a long driving trip and may need to fill their gas tank more frequently compared with their typical refuel routine pattern. Certain implementations may utilize other related credit card purchases (via the Financial Service Provider System 420, for example) as indications that the customer is traveling. In such circumstances, fuel spend limits and/or time period limits may be adjusted accordingly. As an example, a customer residing in a first city may use their credit card to book a hotel for a future date in a second city. The Fraud Prevention System 410 may obtain and utilize such credit card purchase information from the Financial Service Provider System 420 and allow for irregular refueling events within and between the two cities that may occur around the time of the hotel booking. In certain implementations, the customer may be able to override the fuel spend limit via their Customer Device 440.

In certain implementations, the Fraud Prevention System 410 may utilize vehicle information (make, model, year, engine configuration, etc.,) to determine fuel efficiency of the customer's vehicle 430. The Fraud Prevention System 410 may utilize the vehicle fuel efficiency information together with the vehicle gas tank size information plus regular refuel patterns, irregular refuel events, and/or related credit card purchase(s) to adjust the fuel spend limit and/or the minimum time period allowed between refueling events.

In accordance with certain exemplary implementations of the disclosed technology, the Financial Service Provider System 420 (a credit card company, for example) may associate a primary vehicle (using a VIN, for example) with a customer's credit card account. A lookup table or other database record may be utilized to determine the vehicle's fuel tank capacity. When a transaction request is received by the Financial Service Provider System 420 signifying a merchant category code (MCC) for automated fuel dispensers (5542 is an example MCC for Visa), the Fraud Prevention System 410 may be accessed to determine and/or authorize (via the Financial Service Provider System 420) the credit card transaction for up to the amount that would allow the customer to fill their tank with gas. In certain implementation, an attempt to dispense more fuel than could fill the tank of a Vehicle 430 associated with the credit card may be prevented by the Spend Limit System 400.

In certain implementations, a Customer Device 440 may be associated with a financial services provider customer (via the Financial Service Provider System 420) and may be in communication with a Vehicle 430 by Bluetooth™ or other wireless connection. The Customer Device 440 may be a mobile computing device (e.g., a smart phone, tablet computer, smart wearable device, portable laptop computer, voice command device, wearable augmented reality device, or other mobile computing device).

The connection between the Customer Device 440 and one of the vehicles 430A-C associated with the customer may provide additional information to positively identify which Vehicle 430 the customer is attempting to refuel, and the spend limits may be set accordingly to take into account varying gas tank sizes among vehicles owned or otherwise operated by the same customer or customer's family.

The Merchant POS Terminal 450 may be associated with an entity such as a business, corporation, individual, partnership, or any other entity that may be a seller of good and/or services such as a convenience store, a gas station, or the like.

The Network 460 may be of any suitable type, including individual connections via the internet such as cellular or WiFi networks. In some implementations, the Network 460 may enable the communication(s) between the various systems, terminals, vehicles, and devices as depicted in FIG. 4. In some embodiments, the Network 460 may connect with the Customer Device 440 using available channels, including but not limited to: radio-frequency identification (RFID), near-field communication (NFC), Bluetooth™, low-energy Bluetooth™ (BLE), WiFi™, ZigBee™, ambient backscatter communications (ABC) protocols, USB, Ethernet, or LAN. In some embodiments, data can be transmitted across the Network 460 in either an encrypted or un-encrypted format. The Network 460 can comprise a mobile network interface that provides access to a cellular network, the Internet, or another wide-area network. In some embodiments, a mobile network interface may include hardware, firmware, and/or software that allows one or more processors to communicate with other devices via wired or wireless networks, whether local or wide area, private or public, as known in the art. A power source may be configured to provide an appropriate alternating current (AC) or direct current (DC) to power components of the Network 460.

As described above, Fraud Prevention System 410, the Financial Service Provider System 420, and any of the other devices, depicted in the Spend Limit System 400 may be configured to remotely communicate with one another and may include one or more of a microprocessor, microcontroller, digital signal processor, co-processor, memory, or the like or combinations thereof capable of executing stored instructions and operating upon stored data. Memory may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory.

The Spend Limit System 400 may include one or more storage devices configured to store information used by one or more processors (or other components) to perform certain functions related to the disclosed embodiments. In one example, the Spend Limit System 400 may include memory storing instructions to enable one or more processors to execute one or more applications, such as server applications, network communication processes, and any other type of application or software known to be available on computer systems. Alternatively, the instructions, application programs, etc. may be stored in an external storage or available from a memory over the Network 460. The one or more storage devices may be a volatile or non-volatile, magnetic, semiconductor, tape, optical, removable, non-removable, or other type of storage device or tangible computer-readable medium.

In one embodiment, the Spend Limit System 400 may include memory that includes instructions that, when executed by one or more processors, perform one or more processes consistent with the functionalities disclosed herein. Methods, systems, and articles of manufacture consistent with disclosed embodiments are not limited to separate programs or computers configured to perform dedicated tasks.

The Spend Limit System 400 may also be communicatively connected to one or more memory devices (e.g., databases (not shown)) locally or through the Network 460. The remote memory devices may be configured to store information and may be accessed and/or managed by the Financial Service Provider System 420 and/or the Fraud Prevention System 410. By way of example, the remote memory devices may be document management systems, Microsoft® SQL databases, SharePoint® databases, Oracle® databases, Sybase™ databases, Postgres, MariaDB®, Couchbase™, Redis™, MongoDB® or other relational or non-relational databases. Systems and methods consistent with disclosed embodiments, however, are not limited to separate databases or even to the use of a database.

In exemplary embodiments of the disclosed technology, the Spend Limit System 400 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

In some embodiments, one or more web applications may be utilized by the Spend Limit System 400, for example, to interface with the Customer Device 440. In certain implementations, the one or more web applications may include one or more web components. A rendered web component, for example, may be at least partially insulated from styles or variables that are defined outside of the web component, it can easily be copied and embedded in a wide variety of different types of code and applications, while preserving its general functionality. Web components may be programmed in a client-side programming language such as Javascript, although this is not a requirement. Any suitable client-side programming language or software language can also be used.

Figure 5:
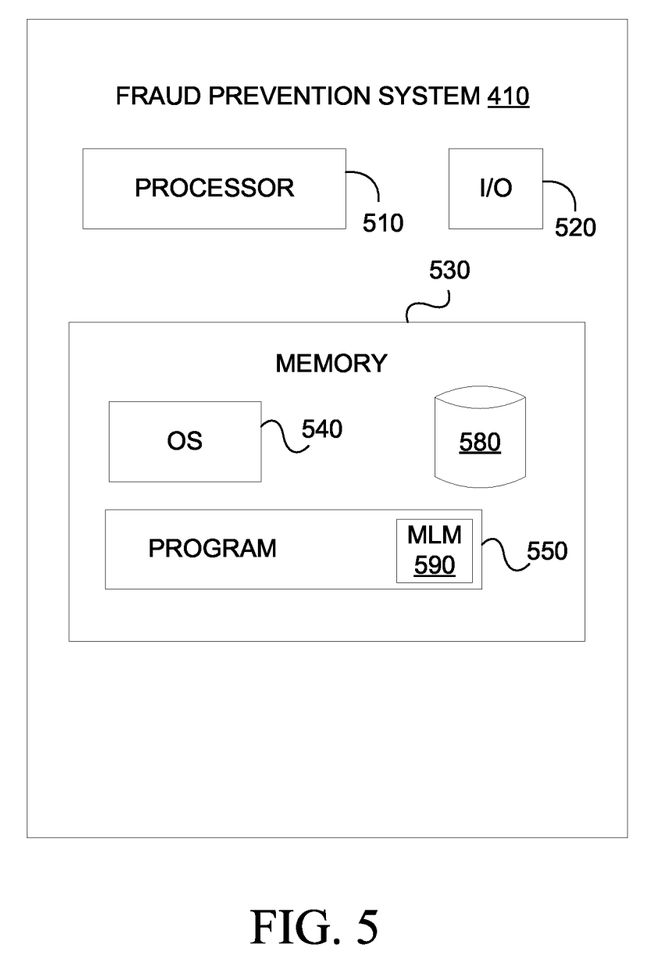
FIG. 5 is a block diagram of a Fraud Prevention System 410 according to an exemplary implementations of the disclosed technology.

FIG. 5 depicts additional detail of an exemplary embodiment of the Fraud Prevention System 410. The Fraud Prevention System 410 may have a similar structure and functions as depicted and described above with respect to FIG. 4. The Fraud Prevention System 410 may include a processor 510, an input/output ("I/O") device 520, a memory 530 containing an operating system ("OS") 540 and a program 550. For example, the Fraud Prevention System 410 may be a single server or may be configured as a distributed computer system including multiple servers or computers that interoperate to perform one or more of the processes and functionalities associated with the disclosed embodiments. In some embodiments, the Fraud Prevention System 410 may further include a peripheral interface, a transceiver, a mobile network interface in communication with the processor 510, a bus configured to facilitate communication between the various components of the Fraud Prevention System 410, and a power source configured to power one or more components of the Fraud Prevention System 410.

The processor 510 may be one or more known processing devices, such as a microprocessor from the Pentium' family manufactured by Intel™ or the Turion™ family manufactured by AMD™. The processor 510 may constitute a single core or multiple core processor that executes parallel processes simultaneously. For example, the processor 510 may be a single core processor that is configured with virtual processing technologies. In certain embodiments, the processor 510 may use logical processors to simultaneously execute and control multiple processes. The processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The Fraud Prevention System 410 may include or be in communication with one or more peripheral interfaces and may include the hardware, firmware and/or software that enables communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

According to an example implementation of the disclosed technology, the Fraud Prevention System 410 includes a memory 530 that may store one or more programs 550 to perform one or more functions of the disclosed embodiments. In some embodiments, the Fraud Prevention System 410 may include a machine learning model (MLM) 590 that may be trained, for example, to recognize customer behavior patterns (and deviations from typical patterns) based on past and/or pending credit card purchases, purchase location data, and/or other available information. In certain implementations, the MLM 590 may issue commands in response to processing an event, in accordance with a model that may be continuously or intermittently updated. Moreover, the processor 510 may execute one or more programs (such as via a rules-based platform or the trained MLM 590), that, when executed, perform functions related to disclosed embodiments.

The memory 530 may include one or more memory devices that store data and instructions used to perform one or more features of the disclosed embodiments. The memory 530 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 530 may include software components that, when executed by processor 510, perform one or more processes consistent with the disclosed embodiments. In some embodiments, memory 530 may include a customer information database 580 for storing customer data to perform one or more of the processes and functionalities associated with the disclosed embodiments.

The customer information database 580 may include stored data relating to a customer profile, vehicles, and customer accounts, such as for example, customer identification information (e.g., name, age, sex, birthday, address, customer status, preferences, preferred language, vehicle(s) owned, greeting name, preferred communication channel, bank accounts, mortgage loan accounts, credit card accounts, car loan accounts, residence, fuel purchase amount and location history, account numbers, authorized users associated with one or more accounts, account balances, account payment history, etc.,) and other such account-related information. The customer information database 580 may further include stored data relating to previous interactions between an organization (or its related entity) and a customer. The customer information database 280 may also include information about business transactions between an organization (and/or its related entity) and a customer that may be obtained from, for example, a transaction server. The customer information database 580 may also include customer feedback data such as approval to enroll in the fuel spend limit program, indications of whether an automated interaction with a customer was successful, online surveys filled out by a customer, surveys answered by a customer following previous interactions to the account provider, digital feedback provided through websites or mobile application associated with the organization or its related entity, reviews written by a customer, complaint forms filled out by a customer, information obtained from verbal interactions with customer (e.g., information derived from a transcript of a customer service call with customer that is generated using, for example, voice recognition techniques) or any other types of communications from a customer to the organization or its related entity. According to some embodiments, the functions provided by the customer information database 580 may also be provided by a database that is external to the Fraud Prevention System 410.

While the Fraud Prevention System 410 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the dialogue management device 122 may include a greater or lesser number of components than those illustrated.

Certain embodiments of the disclosed technology may enable the detection of possible, probable, and/or actual fraud associated with a request for fuel purchase using a credit card. Embodiments disclosed herein may provide systems and methods for detecting identity misrepresentation, identity creation or identity usurpation related to the request. According to an example implementation of the disclosed technology, information supplied by a requester, together with information obtained from other sources, such as public or private databases, may be utilized to determine if the request for a fuel purchase is likely to be fraudulent or legitimate.

Certain example implementations of the disclosed technology may utilize an authentication process in response to the detection of a possible fraudulent request. For example, in response to the detection of one or more indicators of a possible fraudulent fuel purchase using a credit card, an alert may be generated and sent to one or more customer devices associated with the credit card. In one example implementation, a security question may be generated and sent to the customer to authenticate the fuel purchase.

According to an example implementation, if request for fuel purchase using a credit card is analyzed by the Fraud Prevention System 410 and found to have questionable validity, the authorization of the fuel purchase may not proceed without further authentication with the customer.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

USE CASE EXAMPLES

The following exemplary use cases describe examples of possible implementations of the disclosed technology. They are intended solely for explanatory purposes, without limiting the scope of the disclosed technology.

In an example use case, a credit card holder (the customer) may be given an option by their financial services provider (the credit card company or bank) to enroll in a gas spend limit program to limit or eliminate fraudulent use of their credit card (if lost or stolen) for certain purchases. In some cases, the credit card company may offer incentives to encourage the customer to voluntarily enroll in such a program. In other examples, the gas spend limit program may be a requirement for credit card issuance so that the credit card company can limit their exposure to fraudulent purchases. Enrolling in this system may involve downloading a mobile application on the customer's mobile device (e.g., smart phone).

In certain instances, the customer may provide vehicle information (VIN, make, model, options, year, etc.,) to the credit card company for all the vehicles that they possess, own, or otherwise drive (such as a company vehicle, rental car, etc.). In other instances, this information may be obtained independently via public or private sources.

The credit card company may use the vehicle information (and other related information such as gas tank capacity, residence location, gas purchase location, regional gas prices, vehicle fuel efficiency, customer purchase patterns, indications of travel outside typical refuel areas, etc.,) to determine the refuel spend limits accordingly (as described herein). For example, a request for a gas purchase of $100 may be considered highly unusual or possibly fraudulent if the credit card is associated with a compact vehicle having a 10-gallon gas tank capacity in a region where gas prices average $4 per gallon. In such a scenario, the disclosed technology may limit the gas purchase spend to $40.

In another use case example, additional credit card purchases, and/or other information/indications may be utilized to avoid declining legitimate fuel purchases by a credit card customer when an atypical fuel transaction request is received. For example, the customer may be traveling, attempting to frequently fill-up their tank with gas, buying fuel for another vehicle not associated with their account, etc. To distinguish such fuel purchases from fraudulent requests, and to limit the loss exposure, the credit card company may send a notice to the credit card holder when such when an atypical fuel transaction request is received, asking the customer to verify that they are attempting to make such a purchase. In some implementations, a machine learning model may be trained using the customer purchase history, for example, to distinguish between typical and atypical purchase patterns. In certain implementations, other credit card transactions (such as for a hotel) may be utilized to determine that the customer is traveling outside of their normal local region, and the system may authorize gas purchases, even though they are outside they customer's local region and/or are more frequent than normal (indicative of travel). In certain implementations, the risk of inconveniencing a legitimate customer may be balanced with the risk of a fraudulent purchase. In certain implementations, they system will not attempt to limit a refuel event to a partial tank but will rather authorize the automated fuel dispenser for an amount consistent with a full tank of gas for the vehicle(s) associated with the credit card.

In yet another use case example, a customer may own a plurality of vehicles, each with different gas tank capacities. In this example (and also in certain examples where only a single vehicle is associated with the credit card) wireless pairing and/or other connection information between the customer's smart phone and their vehicle may be utilized to identify the most likely vehicle that is in possession of the cardholder at or near the time of the refuel attempt. Furthermore, in certain implementations, geolocation data of the customer's smart phone may be checked before or during the refuel transaction request to make sure that the customer is located at or near the gas station generating the transaction request. In these example scenarios, the use of the additional information may enable a seamless refuel without having to bother the credit card holder.

In yet another use case, a customer may login to the credit card company website or use a mobile app associated with the credit card company. Once authenticated, the customer may consent to communications associated with gas purchases, temporarily turn off the spend limits on their account (to avoid disruptions during upcoming travel), consent to resume the spend limits, etc. Once properly authenticated, the customer may then use their mobile device to access account information and/or perform related functions. This process may provide an improved experience for a customer, by enabling account servicing through digital self-service channels without the friction of a customer having to navigate to a website or mobile app and/or provide login credentials each time there is an interaction with the system.

Another use case involves the system proactively providing a customer with alerts or information based on a predictive analysis of the customer's needs. Such predictive analysis can be conducted using machine learning and modeling in conjunction with knowledge of the customer context. For example, the system may utilize purchase information (hotel, airline, restaurants, etc.) to determine that the customer is traveling, and the system may inform the customer (via an alert, SMS text, etc.,) that the system is aware of the customer travel plans, and may automatically adjust the gas spend limit, allowed refuel frequency, etc. In this way, the system can take proactive steps to meet a customer's needs.

The invention claimed is:

1. A system, comprising:
one or more processors; and
memory in communication with the one or more processors and storing instructions that, when executed by the one or more processors, are configured to cause the system to:
receive, from a merchant point-of-sale terminal, an electronic transaction request to complete a gas-station transaction using a financial account associated with a customer;
receive, from a customer information database in communication with the one or more processor:
customer vehicle tank size;
customer vehicle fuel economy; and
fuel purchase amount and location history;
receive, from a fraud prevention system in communication with the one or more processors, a regional gas price based on a merchant location;
automatically set a spend limit based on a single transaction limit, wherein the single transaction limit is automatically calculated by the one or more processors based on the customer vehicle tank size, the customer vehicle fuel economy, the fuel purchase amount and location history, and the regional gas price;
determine whether the merchant location falls within a known gas-station transaction geographic region;
when the merchant location falls within the known gas-station transaction geographic region, approve a transaction request up to the spend limit; and
when the merchant location falls outside of the known gas-station transaction geographic region, perform one or more fraud prevention actions to authenticate the customer.

2. The system of claim 1, wherein the instructions are further configured to cause the system to:
calculate, with the one or more processors, the single transaction limit by multiplying the tank size by the regional gas price.

3. The system of claim 1, wherein the request comprises a location of the merchant.

4. The system of claim 1, wherein the one or more fraud prevention actions to authenticate the customer comprise one or more of:
algorithmically identify, using a machine learning model trained to recognize a behavior pattern of a customer based on past purchase data, a known gas-station transaction geographic region for the customer based on prior gas-station transactions associated with the customer;
determining, with the machine learning model, whether the customer is travelling based on previous purchase transaction information;
determining, with the machine learning model, a recent geographic location of the customer based on one or more recent non-gas-station transactions associated with the customer; and
determining, with the machine learning model, whether the recent geographic location of the customer is within a predetermined distance threshold of the merchant location.

5. The system of claim 1, wherein the one or more fraud prevention actions to authenticate the customer comprise:
setting a predetermined time threshold;
responsive to authenticating the customer within the predetermined time threshold approving the transaction request up to the spend limit.

6. The system of claim 1, wherein the one or more fraud prevention actions to authenticate the customer comprise:
monitoring a predetermined number of subsequent transactions associated with a financial account associated with the customer; and
responsive to not authenticating the customer within a predetermined time threshold, deny the transaction request and perform one or more fraud mitigation actions.

7. The system of claim 1, wherein performing the one or more fraud prevention actions to authenticate the customer further comprises:
when a geographic location of the customer is within a predetermined distance threshold of the merchant location, authenticating the customer; and
when a geographic location of the customer is outside of the predetermined distance threshold of the merchant location:
cause a mobile device associated with the customer to prompt the customer to perform a secondary authentication process;
responsive to receiving, from the mobile device, an indication that the customer failed the secondary authentication process, not authenticating the customer; and
responsive to receiving, from the mobile device, an indication that the customer completed the secondary authentication process, authenticating the customer.

8. The system of claim 7, wherein the secondary authentication process comprises one or more processes of a facial-recognition process, a fingerprint scan, and a password entry.

9. The system of claim 1, wherein the instructions, when executed by the one or more processors, are further configured to cause the system to:
receive customer input indicative of a trip to an unusual geographic destination from the customer; and
update the known gas-station transaction geographic region based on the customer input.

10. The system of claim 1, wherein the instructions, when executed by the one or more processors, are further configured to cause the system to:
receive customer input to adjust the single transaction limit; and
update the single transaction limit based on the customer input.

11. A method for limiting a transaction amount, the method comprising:
receiving, from a merchant point-of-sale terminal, an electronic transaction request to complete a gas-station transaction using a financial account associated with a customer;
algorithmically identifying, using a machine learning model trained to recognize a behavior pattern of the customer based on past purchase data, a known gas-station transaction geographic region for the customer based on prior gas-station transactions associated with the customer;
setting a spend limit based on a single transaction limit, wherein the single transaction limit is based on one or more of:
  a tank size of a vehicle associated with the customer;
  a fuel economy of the vehicle associated with the customer; and
  a fuel purchase amount and location history associate with the customer;
determining whether a merchant location falls within the known gas-station transaction geographic region;
approving, based at least in part on the behavior pattern of the customer, a transaction request up to the spend limit when the merchant location falls within the known gas-station transaction geographic region; and
performing one or more fraud prevention actions to authenticate the customer when the merchant location falls outside of the known gas-station transaction geographic region.

12. The method of claim 11, further comprising:
receiving vehicle information;
identifying a first vehicle associated with the customer based on the vehicle information;
identifying first vehicle characteristics associated with the first vehicle, the first vehicle characteristics comprising a first gas tank size; and
calculating the single transaction limit by multiplying the first gas tank size by a determined gas price.

13. The method of claim 12, further comprising:
identifying a gas price based on the merchant location; and
calculating the single transaction limit by multiplying the first gas tank size by the gas price.

14. The method of claim 11, wherein the one or more fraud prevention actions to authenticate the customer further comprise:
determining whether the customer is travelling based on previous purchase transaction information;
determining a recent geographic location of the customer based on one or more recent non-gas-station transactions associated with the customer; and
determining whether the recent geographic location of the customer is within a predetermined distance threshold of the merchant location.

15. The method of claim 11, wherein the one or more fraud prevention actions to authenticate the customer further comprise:
setting a predetermined time threshold;
responsive to authenticating the customer within the predetermined time threshold approving the transaction request up to the spend limit.

16. The method of claim 11, wherein the one or more fraud prevention actions to authenticate the customer further comprise:
monitoring a predetermined number of subsequent transactions associated with a financial account associated with the customer; and
responsive to not authenticating the customer within a predetermined time threshold, denying the transaction request and performing one or more fraud mitigation actions.

17. The method of claim 11, wherein the one or more fraud prevention actions to authenticate the customer further comprise:
authenticating the customer when a geographic location of the customer is within a predetermined distance threshold of the merchant location; and
when a geographic location of the customer is outside of the predetermined distance threshold of the merchant location:
  causing a mobile device associated with the customer to prompt the customer to perform a secondary authentication process;
  responsive to receiving, from the mobile device, an indication that the customer failed the secondary authentication process, not authenticating the customer, wherein the secondary authentication process comprises one or more processes of a facial-recognition process, a fingerprint scan recognition, and a password entry; and
  responsive to receiving, from the mobile device, an indication that the customer passed the secondary authentication process, authenticating the customer and approving a transaction.

18. The method of claim 11, further comprising:
receiving customer input indicative of a trip to a geographic destination from the customer; and
updating the known gas-station transaction geographic region based on the customer input.

19. The method of claim 11, further comprising:
receiving customer input to adjust the single transaction limit; and
updating the single transaction limit based on the customer input.

20. A non-transitory computer-readable storage medium storing instructions that are configured to cause one or more processors to perform a method of:
receiving, from a merchant point-of-sale terminal, an electronic transaction request to complete a gas-station transaction using a financial account associated with a customer;
algorithmically identifying, using a machine learning model trained to recognize a behavior pattern of the customer based on past purchase data, a known gas-station transaction geographic region for the customer based on prior gas-station transactions associated with the customer;
setting a spend limit based on a single transaction limit, wherein the single transaction limit is based on one or more of:
a tank size of a vehicle associated with the customer;
a fuel economy of the vehicle associated with the customer; and
a fuel purchase amount and location history associate with the customer;
determining whether a merchant location falls within the known gas-station transaction geographic region;
approving, based at least in part on the behavior pattern of the customer, a transaction request up to the spend limit when the merchant location falls within the known gas-station transaction geographic region; and
performing one or more fraud prevention actions to authenticate the customer when the merchant location falls outside of the known gas-station transaction geographic region.

\* \* \* \* \*